Jan. 20, 1970 SHIZUO TAKASHINO 3,490,666

MAGNETIC TAPE RECORDING AND REPRODUCING DEVICE

Filed March 21, 1968 3 Sheets-Sheet 1

INVENTOR.

Shizuo Takashino

BY Hill, Sherman, Meroni, Gross & Simpson ATTORNEYS

Jan. 20, 1970 SHIZUO TAKASHINO 3,490,666

MAGNETIC TAPE RECORDING AND REPRODUCING DEVICE

Filed March 21, 1968

3 Sheets-Sheet 2

INVENTOR.

Shizuo Takashino

BY Hill, Sherman, Meroni, Gross & Simpson ATTORNEYS

Jan. 20, 1970 SHIZUO TAKASHINO 3,490,666

MAGNETIC TAPE RECORDING AND REPRODUCING DEVICE

Filed March 21, 1968 3 Sheets-Sheet 3

INVENTOR.

Shizuo Takashino

BY Hill, Sherman, Meroni, Gross & Simpson ATTORNEYS

United States Patent Office 3,490,666

Patented Jan. 20, 1970

3,490,666
MAGNETIC TAPE RECORDING AND REPRODUCING DEVICE

Shizuo Takashino, Saitama-ken, Japan, assignor to Sony Corporation, Tokyo, Japan, a corporation of Japan
Filed Mar. 21, 1968, Ser. No. 714,958
Claims priority, application Japan, Apr. 7, 1967, 42/22,218, 42/29,129
Int. Cl. B65h *23/32*
U.S. Cl. 226—4 8 Claims

ABSTRACT OF THE DISCLOSURE

A magnetic tape recording and reproducing device comprising a pair of capstans, and a change-over lever having a pair of pinch rollers selectively urged into rotating contact with the pair of capstans. The rotational center of the change-over lever is adapted to move substantially along a bisecting line joining the pair of capstans. A toggle spring is fixed at one end and secured at the other end to one end of the change-over lever. The change-over lever is selectively turned to either side of the bisecting line by the toggle spring and urges one of the pinch rollers into rotating contact with one of the capstans to drive the tape. The pair of pinch rollers moves away from the capstans under the control of the change-over lever. Stops are provided to bias and hold the change-over lever on one side of the bisecting line when the pinch rollers are disengaged from the capstans to allow movement of the tape only in a forward direction when the change-over lever initiates tape movement. The invention also includes the method of engaging and reversibly driving a magnetic tape.

BACKGROUND OF THE INVENTION

This invention relates to a magnetic tape recording and reproducing device, and more particularly to an automatic reversing tape recorder.

It is known to reverse the direction of a tape with a reciprocating magnetic tape recording and reproducing device of the type having a pair of capstans rotating in opposite directions positioned on both sides of a magnetic head assembly and having pinch rollers selectively urged into rotating contact with one of the capstans to reverse the direction of the magnetic tape for recording and/or reproducing.

In such systems, however, the pinch rollers are selectively brought into rotating contact with the capstans by means of a strong plunger or the rotating direction of one capstan used in change for reversal of the tape transfer direction. Accordingly, the former results in great power consumption for reversal of the tape transfer direction, while the latter does not permit of rapid change of the direction. Furthermore, with the prior art systems the tape traveling direction cannot be readily known during playing of the tape.

SUMMARY

The present invention is primarily directed to a mechanism for reversal of the tape transfer direction such that a stopper is shifted electrically by a small plunger or mechanically by some mechanical means and pinch rollers are selectively urged into rotating contact with capstans only by the turning effort of the capstans to change the tape transfer direction. Consequently, the mechanism of this invention requires less energy for the change of the tape transfer direction, and hence is of particular utility when employed in portable or miniature tape recorders.

Accordingly, one object of the present invention is to provide a tape recorder which is capable of easy reversal of the tape transfer direction.

Another object of this invention is to provide a tape recorder in which reversal of the tape transfer direction is achieved chiefly by the turning effort of capstans.

Still another object of this invention is to provide a tape recorder in which the tape is always driven in a forward direction at the start of recording or playback.

Other objects, features and advantages of this invention will become apparent from the following description taken in conjunction with the accompanying drawings.

DESCRIPTION OF THE PREFERRED EMBODIMENTS

Figure 1:
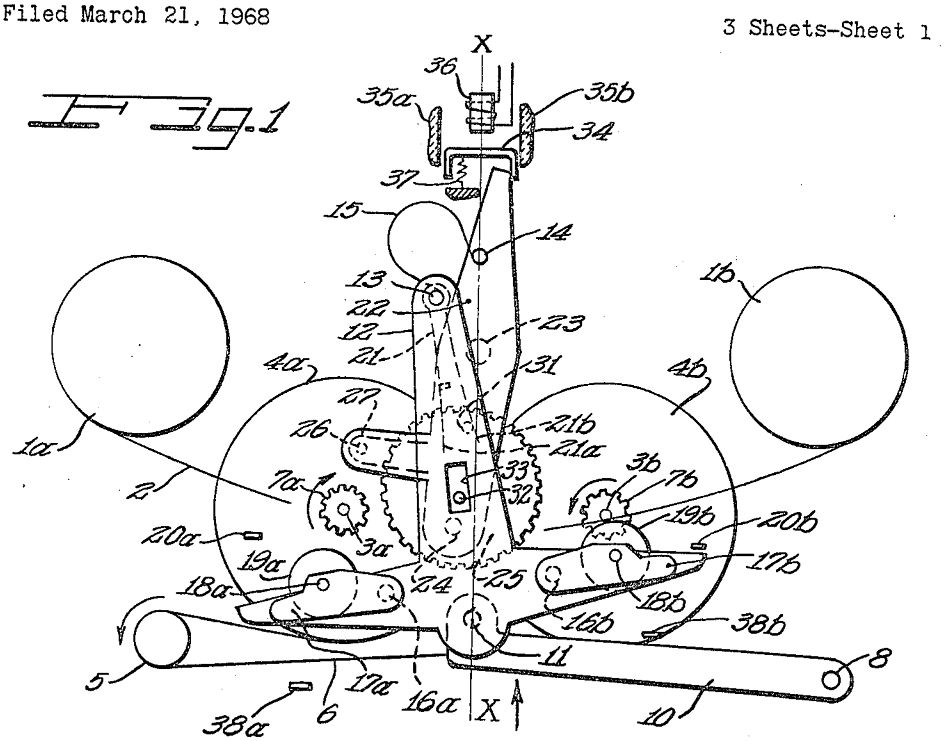
FIG. 1 is a plan view schematically illustrating the principal part of an automatic tape reciprocating device according to this invention.

Referring to the drawings, one embodiment of this invention will hereinafter be described in detail.

The magnetic tape recording and reproducing device has a supply reel 1*a* and a take-up reel 1*b* for a magnetic tape 2. The magnetic tape 2 is reversibly driven by a pair of capstans 3*a* and 3*b*, a pair of flywheels 4*a* and 4*b* affixed to the capstans 3*a* and 3*b*, and a motor 5, FIGS. 1 and 2. The flywheels 4*a* and 4*b* are coupled with the motor 5 by means of a belt 6. The motor 5 is normally revolved in a direction indicated by arrows. The capstans 3*a* and 3*b* have mounted thereon pinion gears 7*a* and 7*b*, respectively.

Figures 3, 4, 5:
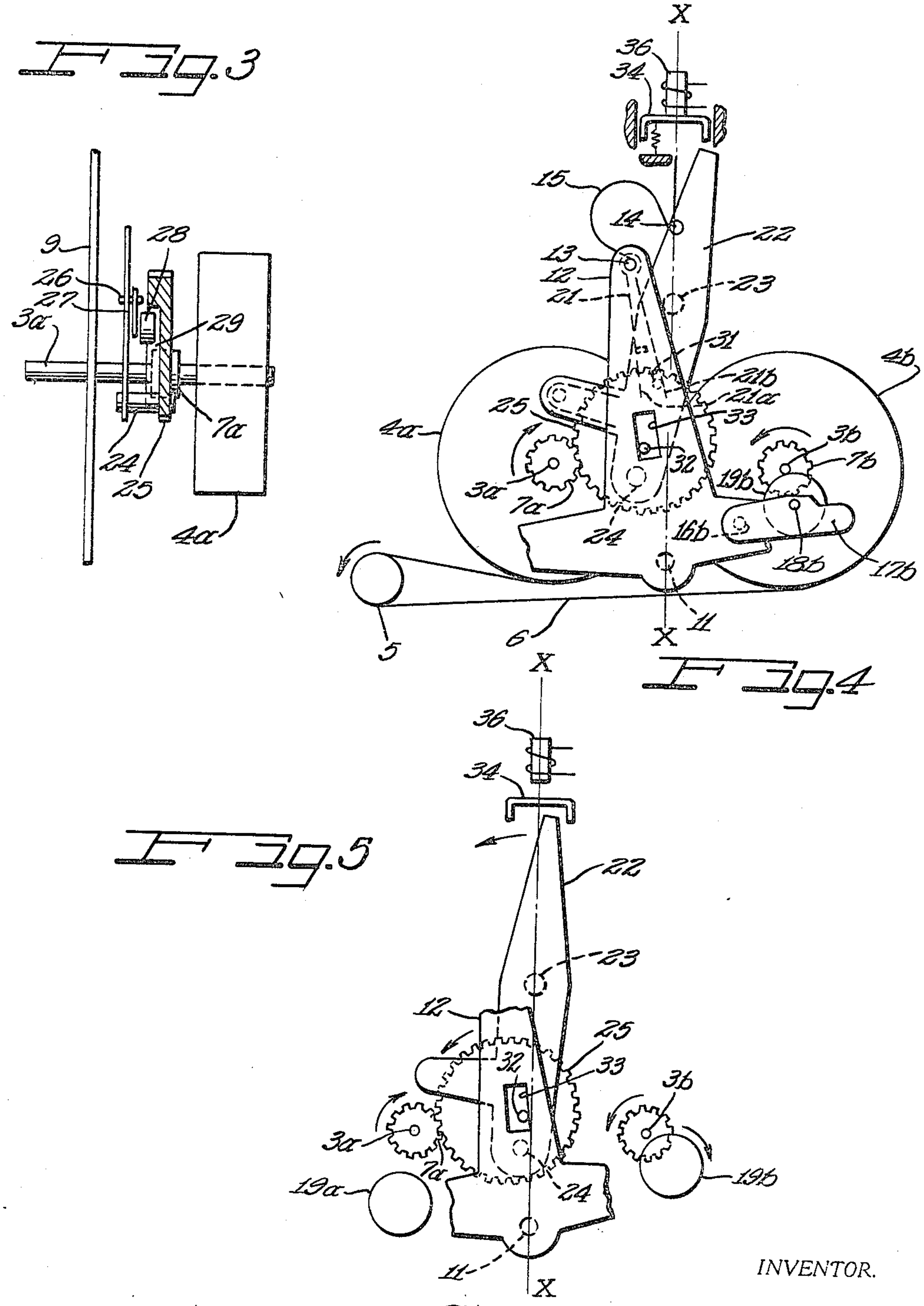
FIG. 3 is a cross-sectional view taken along the line X—X in FIG. 2, illustrating one portion thereof.
FIGS. 4 to 7 are similar schematic plan views, for explaining the operation of the automatic tape reciprocating device of this invention.

An arm 10 is pivoted at one end to a chassis 9, FIG. 3, by means of a pin 8 and extends in a direction intersecting a bisecting line X—X of the line joining the pair of capstans 3*a* and 3*b* at right angles thereto. The free end of the arm 10 has pivotally attached by a pin or pivot 11 a first change-over lever 12. The lever 12 extends substantially in the direction of the line X—X. At the free end of the first change-over lever 12 is a toggle spring 15 stretched between a pin 13 mounted on the lever 12 and a pin 14 mounted on the chassis 9. The pin 14 is located substantially on the line X—X, while the pivot 11 is positioned to move along the line X—X when the arm 10 turns. During recording and playback the arm 10 is pushed in a direction as indicated by the arrow, FIG. 1, and is held there. When the tape recorder is out of operation the arm 10 is returned to its initial position, FIG. 8.

The first lever 12 has arms projecting on both sides therefrom at substantially right angles, and a pair of rotary members 17*a* and 17*b* are rotatably mounted on the arms by means of pins 16*a* and 16*b*. Also mounted on the rotary members 17*a* and 17*b* are pinch rollers 19*a* and 19*b* rotatably mounted on pins 18*a* and 18*b*. The lever 12 is adapted to turn about the pin 11 by a change-over operation to be described below, by which the pinch rollers 18*a* and 18*b* are selectively brought into rotating contact with the capstans 3*a* and 3*b*. Movement of the lever 12 is limited by a pair of stoppers 20*a* and 20*b*. The pinch rollers 19*a* and 19*b* are urged into rotating contact with the capstans 3*a* and 3*b* under a predetermined pressure, since the rotary members 17*a* and 17*b* are biased by suitable means such as springs (not shown) in a rotatable manner with respect to the lever 12.

The pin 13 has fixed thereto the base portion of a substantially U-shaped spring 21, and the free ends 21*a* and 21*b* extend along the underside of the lever 12. Under the first lever 12 there is rotatably mounted on the chassis a second lever 22 by means of a pin 23 substantially along the line X—X in a manner to overlap the first lever 12. On one free end of the second lever 22 is a pin 24 which has eccentrically and rotatably attached thereto a gear or a cam 25. The cam 25 lies substantially midway between the pinion gears 7*a* and 7*b*. The second lever 22 has a projection 22', on the free end of which an arm 27 is rotatably mounted by a pin 26. A pin or roller 28 is mounted on the free end of the arm 27 and is biased by a spring 30 in a manner to make contact with a cam face 29 formed in one face of the gear 25, for example, in a V-shaped configuration, FIG. 2.

A pair of pins 31 and 32 are mounted on the upper side of the second lever 22. The pin 31 lies between the free ends 21*a* and 21*b* of the U-shaped spring 21 and is selectively urged into contact with the free ends 21*a* and 21*b* to bias the second lever 22. The pin 32 is fitted into a concave portion or an aperture 33 formed in the first lever 12.

The other free end of the second lever 22 is engaged with a left or right arm 34*a* or 34*b* of a stopper 34 of a substantially C-shaped configuration, which limits the rotational movement of the second lever 22 by the spring 21. The stopper 34 is adapted to be shifted along a pair of guides 35*a* and 35*b* upwardly as shown in the drawings by pulling means such as an electromagnet 36. The stopper 34 has a return spring 37. The stopper 34 may be moved by mechanical means instead of the electromagnet means 36. During recording or playback operation of the device the pinch roller 19*b* is held in rotating contact with the capstan 3*b* to drive the magnetic tape 2 in a forward direction from the supply reel 1*a* to the take-up reel 1*b*, FIGS 1 and 2. Under such conditions, the first lever 12 is biased by the toggle spring 15 to turn counterclockwise, and consequently the right free end 21*b* of the U-shaped spring 21 mounted on the lever 12 pushes the pin 31 of the second lever 22, to urge the lever 22 to turn in a clockwise direction. However, the free end of the second lever 22 comes into engagement with the right arm 34*b* of the stopper 34 to prevent engagement of the gear 25 with the lefthand pinion 7*a*. Thus, the roller 28 is pressed against the peak of the substantially V-shaped cam face 29 by the bias of a spring 30 of the arm 27 mounted on the second lever 22, so that the gear 25 does not turn and is held in the disengaged position, FIGS. 1 and 2. The tape 2 is driven in the forward direction for recording or reproducing until arrival of an instruction signal for reversal of the tape transfer direction.

Upon detection of the instruction signal the electromagnet means 36 is energized to shift the stopper 34 to reverse the direction of the tape. The instruction signal may be detected by any desired means, for example, a time constant circuit which is adapted to apply a current to the electromagnet means 36 only when no reproducing signal is sensed for a predetermined period of time, or an instruction signal previously recorded on the tape may be picked up by a magnetic head or reproducing head specifically provided for this purpose. It is also possible to derive a reversing instruction by fixing the tape at both ends to the reels and providing detecting means, for example, a generator for detecting rotation of the reels, to detect the instruction signal upon interruption of a signal emanating from the generator based on completion of the tape transfer in one direction.

When the electromagnet means 36 is energized to attract the stopper 34 in the direction indicated by the arrow as shown in FIG. 4, the free end of the second lever 22 is disengaged from the stopper 34. This allows the second lever 22 to be turned further clockwise under the influence of the U-shaped spring 21, causing the gear 25 to mesh with the pinion gear 7*a* and revolve the gear 25 counter-clockwise. The gear 25 is attached to the second lever 22 eccentrically. The rotation of the gear 25 causes turning of the second lever 22 counter-clockwise, FIG. 5, and as a result, the pin 32 mounted on the second lever 22 pushes the right edge of the aperture 33 of the first lever 12 to turn the lever in a clockwise direction about the pin 11.

Figures 6, 7, 8:
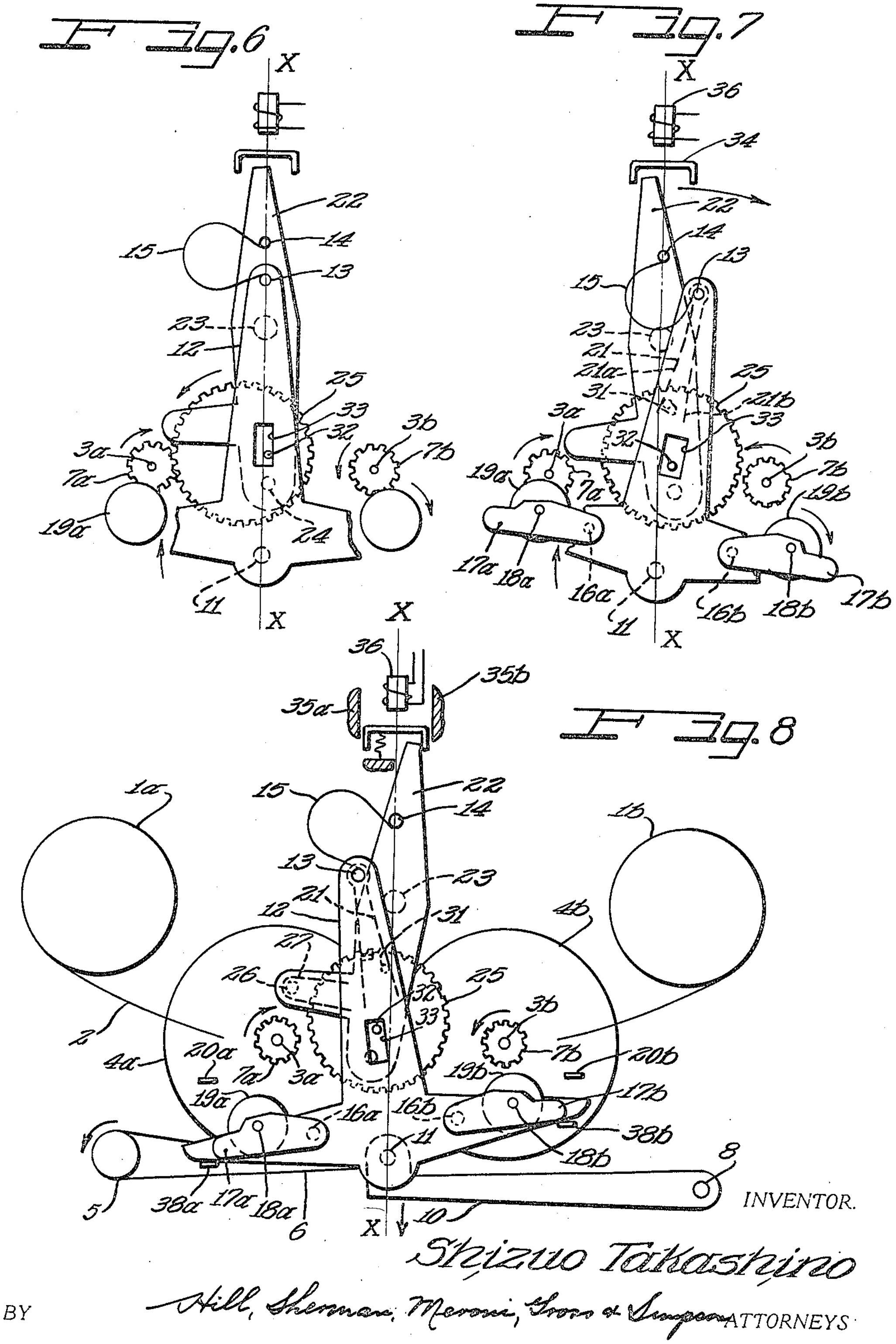
FIG. 8 is a similar plan view illustrating the device in its standstill condition.

When the pin 13 has passed the line X—X, FIG. 6, the first lever 12 is snapped by the toggle spring 15, to bring the pinch roller 19*a* into rotating contact with the capstan 3*a* and thereby drive the tape in a reverse direction, FIG. 7. In addition, the turning of the first lever 12 in the clockwise direction causes the left free end 21*a* of the U-shaped spring 21 to engage the pin 31, and consequently the second lever 22 is biased to turn counter-clockwise to engage its free end with the left arm 34*a* of the stopper 34. The tape 2 is driven in a backward direction from the take-up reel 1*b* to the supply reel 1*a*.

Upon sensing the instruction signal with the tape being driven by the capstan 3*a*, the free end of the second lever 22 is shifted in a direction indicated by the arrow in FIG. 7, causing the respective members to carry out operations similar to the above-described ones to reverse the tape transfer direction.

Figure 2:
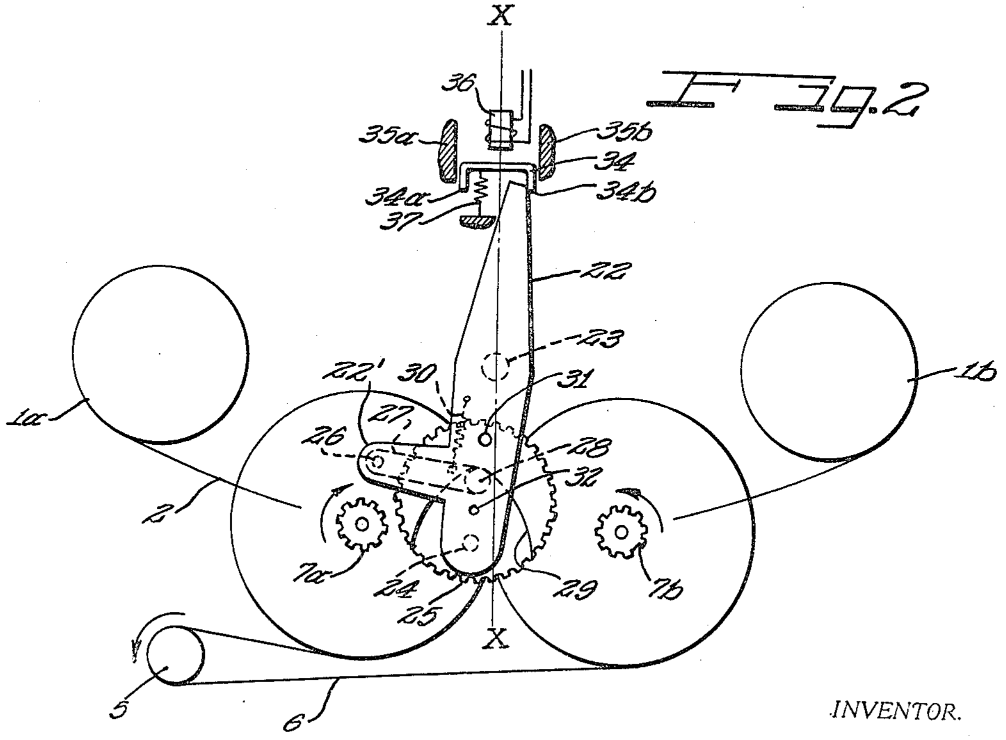
FIG. 2 is a plan view similar to FIG. 1 but having one portion removed.

When the tape recorder is out of operation or in the stop state, the arm 10 is turned by the toggle spring 15 to its inoperative position. FIG. 8, to hold the pinch rollers 19*a* and 19*b* out of contact with the captans 3*a* and 3*b*. In this case, when the arm 10 is pushed again to initiate recording or reproducing in such conditions as depicted in FIGS 1 and 2, the tape 2 is always driven in the forward direction irrespective of which pinch roller had been in rotating contact with the capstan 3*a* or 3*b*, namely, irrespective of the tape transfer direction prior to stopping of the tape recorder. For this purpose, the first lever 12 is biased by a pair of stoppers 38*a* and 38*b* in such a manner that the pin 13 of the first lever 12 lies on the left side of the line X—X when the arm 10 is in its inoperative position, FIG. 8. Thus, when the arm 10 is pushed up the first lever 12 is put into the condition as depicted in FIGS. 1 and 2, to drive the tape 2 in the forward direction. Consequently, the tape transfer direction at the start of the recording or reproducing is known in advance, and this eliminates possible difficulty in mounting of the tape on the recording and reproducing device.

Automatic reversal of the tape transfer direction is effected with a simple arrangement requiring only momentary attraction of the stopper 34 with energization of the electromagnet means 36 based on the detected instruction signal or by shifting the stopper 34 based on detection of the tape end by mechanical means. The change-over of the first and second levers is effected by the driving force of the motor 5, and hence the change-over operation can be accomplished without additional apparatus requiring power and introducing the possibility of failure.

The pinion gears 7*a* and 7*b* and the gear 25 may be constructed in the form of rollers or rotary members. While, in the foregoing the gear or the rotary member 25 is arranged to selectively be urged into rotating contact with the pinion gears 7*a* and 7*b* and consequently the capstans 3*a* and 3*b*, it is to be understood that this can be achieved by selective rotating contact of the gear 25 with a pair of rotary drive shafts rotating in opposite directions.

The method of automatically reversibly recording and reproducing on a magnetic tape 2 comprises driving a pair of capstans 3*a* and 3*b*, urging a pair of pinch rollers 19*a* and 19*b* selectively into rotating contact with the pair of capstans, bossing the pair of pinch rollers with a change-over lever 12, moving the position of the rotational center of the change-over lever 12 substantially along a bisecting line X—X of the line joining the pair of capstans, fixing a toggle spring 15 at one end 14 and securing at the other end 13 to one end of the change-over lever 12, sensing an instruction signal, turning the change-over lever selectively to either side of the bisecting line by the toggle spring and urging one of the pinch rollers into rotating contact with one of the capstans on sensing of the instruction signal, moving the position of the rotational center of the change-over lever 12 along the bisecting line in a direction that the pair of pinch rollers move away from the capstans, and biasing and holding the change-over lever 12 by the stops 38*a* and 38*b* on either side of the bisecting line when the pinch rollers are disengaged from the capstans.

Although minor modifications might be suggested by those versed in the art, it should be understood that I wish to embody within the scope of the patent warranted hereon, all such modifications as reasonably and properly come within the scope of my contribution to the art.

I claim as my invention:

1. A magnetic tape recording and reproducing device comprising:

a pair of capstans;

a first change-over lever having a pair of pinch rollers selectively urged into rotating contact with said capstans;

a pair of rotary drive means;

a rotary member located between said pair of rotary drive means;

a second change-over lever having eccentrically pivoted thereto said rotary member;

means for biasing said second change-over lever in a manner to selectively urge said rotary member into rotating contact with either one of said rotary drive means;

stopper means for stopping said second change-over lever to prevent said rotary member from making rotating contact with said rotary drive means;

means for selectively disengaging said second change-over lever from said stopper means; and means for turning said first change-over lever by turning of said second change-over lever due to rotating contact of said rotary member with said rotary drive means.

2. A magnetic tape recording and reproducing device as claimed in claim 1 wherein said rotary drive means are concentric with said capstans.

3. A magnetic tape recording and reproducing device as claimed in claim 1 wherein said rotary drive means are gears.

4. A magnetic tape recording and reproducing device as claimed in claim 1 wherein said rotary member is a gear.

5. A magnetic tape recording and reproducing device comprising:

a pair of capstans;

a change-over lever having a pair of pinch rollers selectively urged into rotating contact with said pair of capstans;

means for moving the position of the rotational center of said change-over lever substantially along a bisecting line of the line joining said pair of capstans;

a toggle spring fixed at one end and secured at the other end to one end of said change-over lever;

means for turning said change-over lever selectively to either side of the bisecting line by said toggle spring and urging one of said pinch rollers into rotating contact with one of said capstans;

means for moving the position of the rotational center of said change-over lever along the bisecting line in a direction that said pair of pinch rollers move away from said captans; and stopper means for biasing and holding said change-over lever on either side of the bisecting line when said pinch rollers are disengaged from said capstans.

6. A method of automatically reversibly recording and reproducing on a magnetic tape comprising:

driving a pair of capstans;

urging a pair of pinch rollers selectively into rotating contact with the pair of capstans;

bossing the pair of pinch rollers with a change-over lever;

moving the position of the rotational center of the change-over lever substantially along a bisecting line of the line joining the pair of capstans;

fixing a toggle spring at one end and securing at the other end to one end of the change-over lever;

turning the change-over lever selectively to either side of the bisecting line by the toggle spring and urging one of the pinch rollers into rotating contact with one of the capstans;

moving the position of the rotational center of the change-over lever along the bisecting line in a direction that the pair of pinch rollers move away from the capstans; and biasing and holding the change-over lever on either side of the bisecting line when the pinch rollers are disengaged from the capstans.

7. A magnetic tape recording and reproducing device according to claim 1 wherein said stopper means comprises a generally U-shaped member which may be selectively moved to either of a pair of positions to engage the second change-over lever.

8. A magnetic tape recording and reproducing device according to claim 1 wherein said rotary member is formed with a cam face, and an arm rotatably mounted on the first change-over lever and spring biased in a first direction, and formed with a cam follower which engages said cam face.

References Cited

UNITED STATES PATENTS 3,070,321 12/1962 Bara ---------------- 226—50 X
3,091,380 5/1963 Harris ---------------- 226—50

ALLEN N. KNOWLES, Primary Examiner

U.S. Cl. X.R.

226—50